Feb. 5, 1957

R. A. FRYE 2,780,484

KNOCKDOWN STRUCTURE

Filed April 8, 1954

4 Sheets-Sheet 1

INVENTOR
REINHOLD A. FRYE
BY
Charles D. Richard
ATTORNEY

Feb. 5, 1957 R. A. FRYE 2,780,484
KNOCKDOWN STRUCTURE
Filed April 8, 1954 4 Sheets-Sheet 2

INVENTOR
REINHOLD A. FRYE
BY
Charles D Richard
ATTORNEY

Feb. 5, 1957  R. A. FRYE  2,780,484
KNOCKDOWN STRUCTURE
Filed April 8, 1954  4 Sheets-Sheet 3
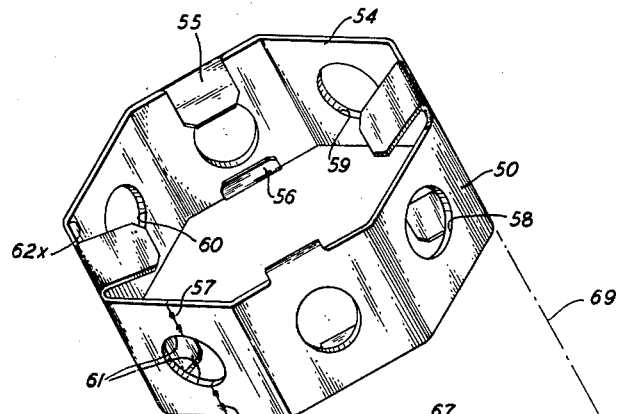
FIG. 16
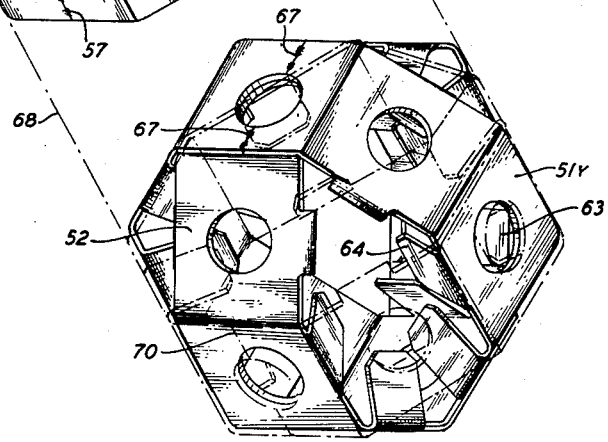
FIG. 17
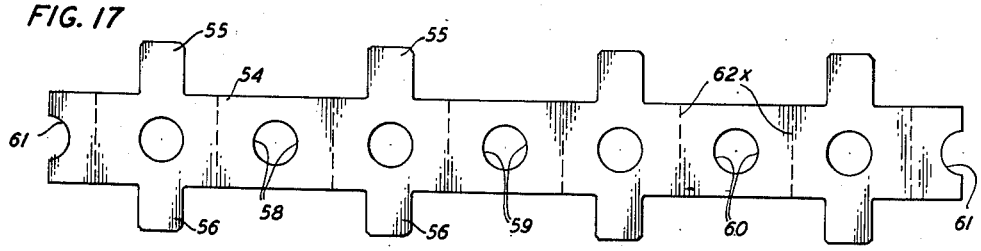
FIG. 18
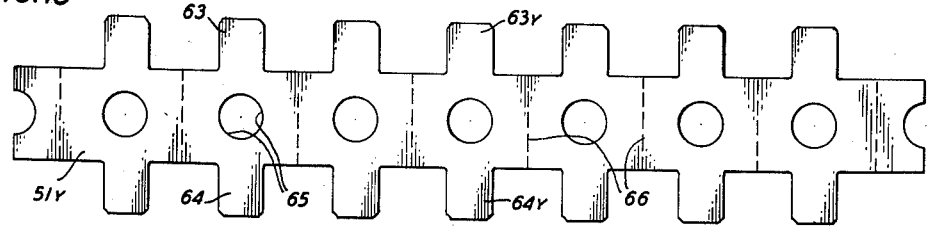
INVENTOR
REINHOLD A. FRYE
BY
Charles D Richard
ATTORNEY Feb. 5, 1957 R. A. FRYE 2,780,484
KNOCKDOWN STRUCTURE
Filed April 8, 1954 4 Sheets-Sheet 4
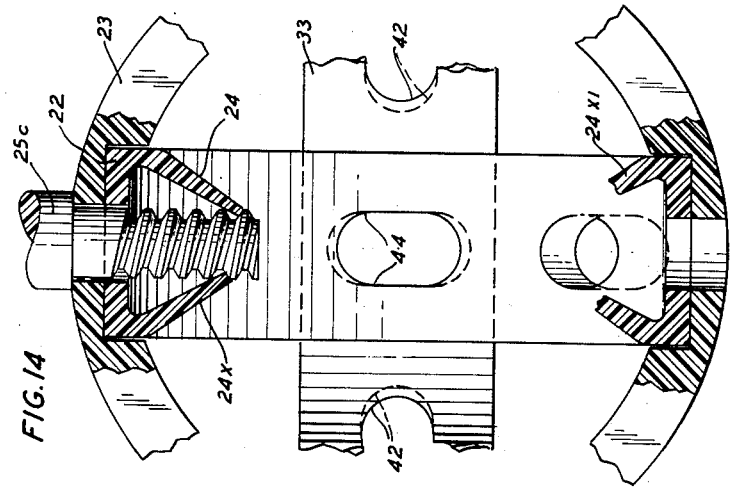
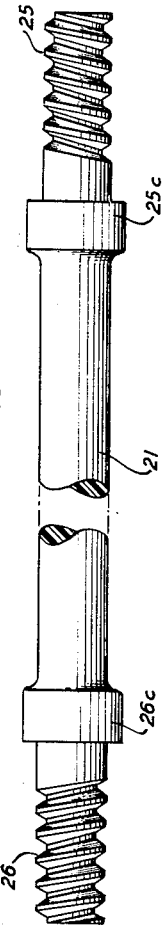
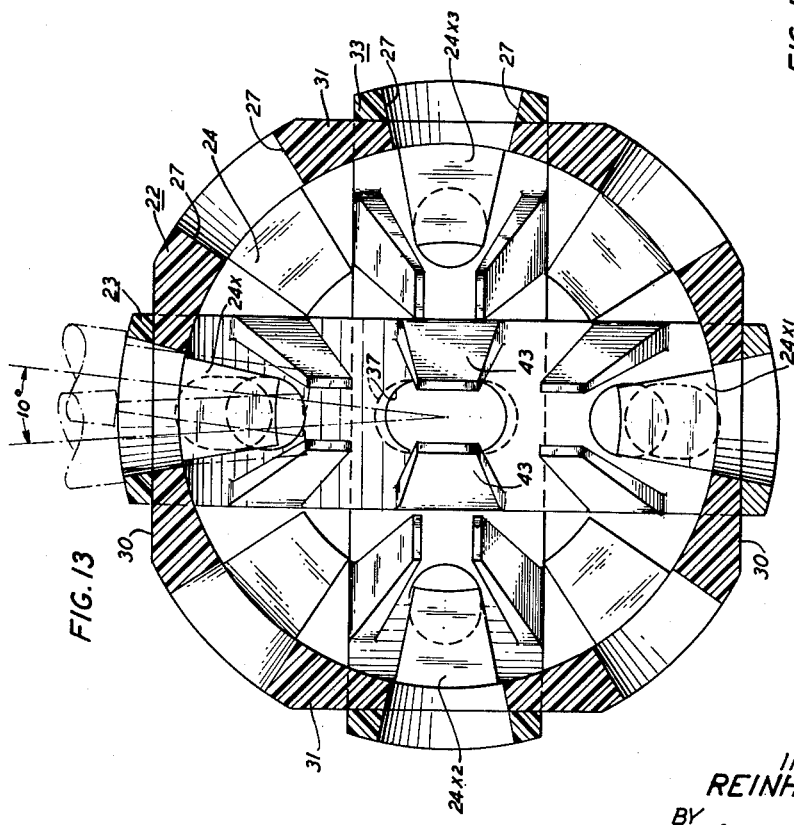
INVENTOR
REINHOLD A. FRYE
BY
Charles D Richard
ATTORNEY

United States Patent Office 2,780,484
Patented Feb. 5, 1957

2,780,484

KNOCKDOWN STRUCTURE

Reinhold A. Frye, River Edge, N. J.

Application April 8, 1954, Serial No. 421,825

10 Claims. (Cl. 287—54)

This invention relates to structures of the so-called knock down type.

More specifically, the invention has reference to a type of connector device which is particularly well adapted for use for connecting co-operating spacer bars which are required to be inter-connected in straight and angular relation to each other, as in the erection of instructive structures of the toy class, for example, and in the erection of large structures, such as scaffoldings and other temporary structures used by the military services, requiring to be erected quickly, dismantled and re-erected at another location.

In the spacer bar connector device, as one of the novel features of the invention, a plurality of inter-fitting ring shaped members are formed with elements of nut screws, in the form of inwardly and radially extending resilient projections arranged by pairs, engageable by the differentially screw threaded end portions of the co-operating spacer bars to form any type and size of structure assembly desired, the nut screw elements in each pair being adapted to be tensioned upon a simple plunger-like movement of the spacer bars in position therebetween, but capable of re-engaging the screw threaded end portion of the engaged bar by the medium of their own tension, which movement may then be followed by the manual rotation of the engaged spacer bar for simultaneously securing connector members which may engage both ends of a spacer bar firmly in assembled relation in the manner of a turn buckle arrangement.

Figure 2:
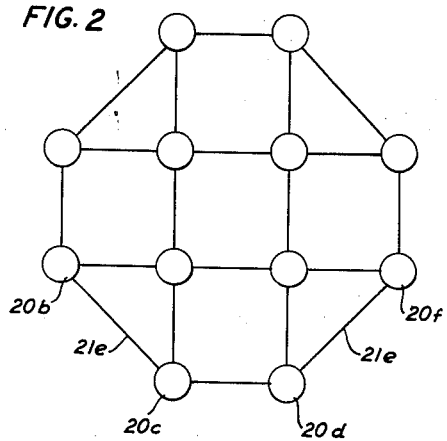
Figure 1:
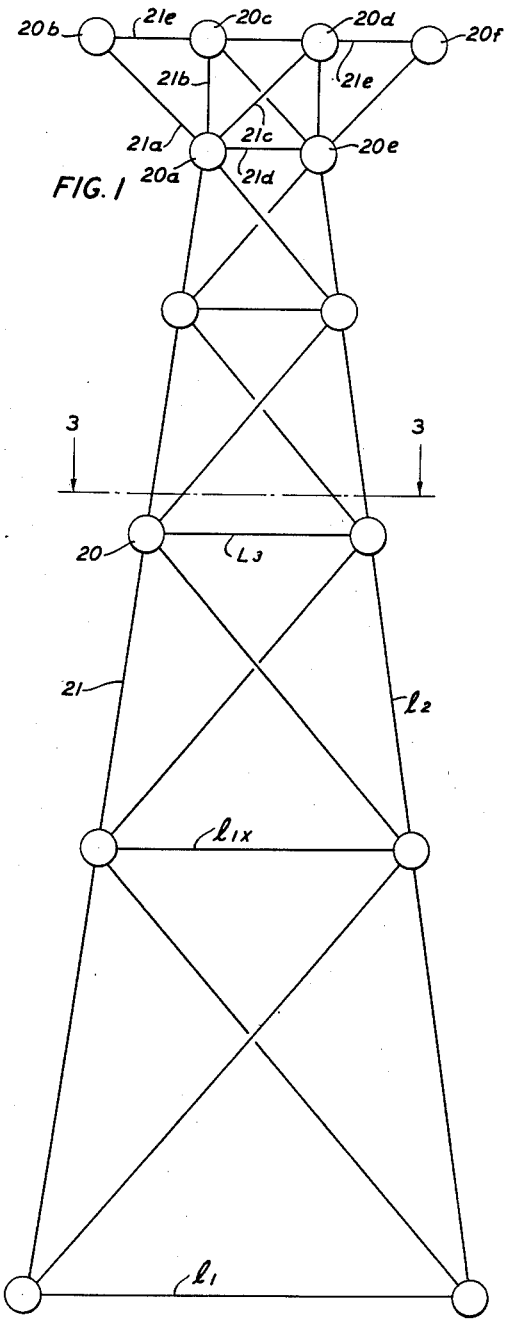
Figure 3:
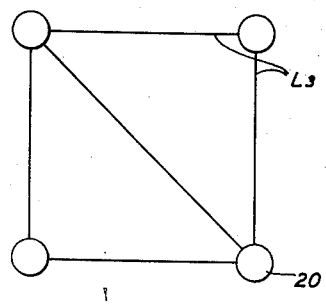
Figure 4:
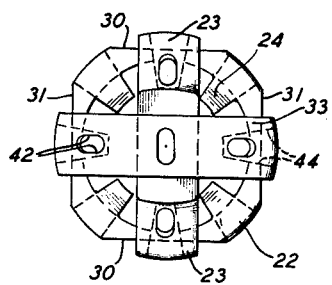
Figure 5:
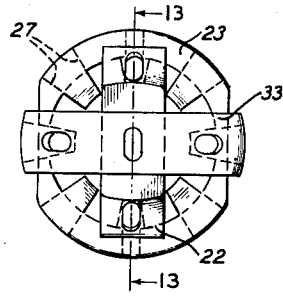
Figure 6:
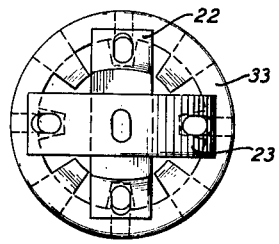
Figure 7:
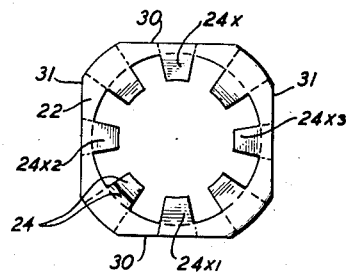
Figure 8:
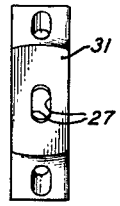
Figure 9:
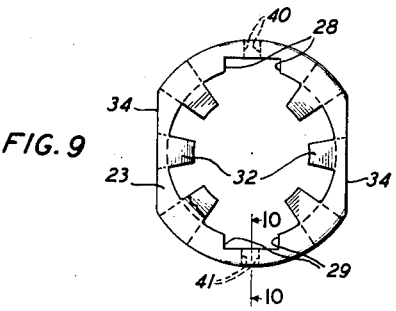
Figure 10:
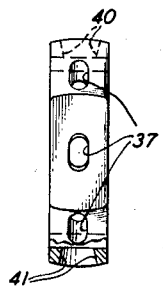
Figure 11:
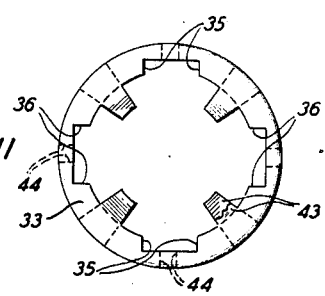
Figure 12:
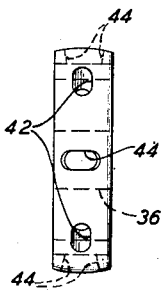

Other novel features and advantages of the invention will appear from the following description and by the claims appended thereto, reference being had to the accompanying drawing in which:

Fig. 1 is an elevation view of a toy structure erected by the use of differentially screw threaded spacer bars and connector devices, constructed according to the invention, Fig. 2 is a top view of such tower structure, Fig. 3 is a cross-sectional view taken on line 3—3 of Fig. 1, Fig. 4 is a front elevation view of the connector device shown assembled, Fig. 5 is another elevation view shown 90° from the position shown in Fig. 4, Fig. 6 is another elevation view looking in the direction indicated by the arrows in Fig. 5, Fig. 7 is an elevation view of the inner disposed ring used in the assembly shown in Fig. 4, one of the nut screw projections being shown with portions broken away, Fig. 8 is a side view showing more clearly the radially formed spacer bar guiding elements at the periphery of the ring of Fig. 7, Fig. 9 is an elevation view of the intermediary positioned ring shaped member in the assembly of Fig. 4, showing its transverse diametrically opposite key ways for engaging any one of the two pairs of parallelly disposed guiding elements of the ring shaped member shown in Fig. 7, one of the radially extending yieldable projections being shown with portions broken away, Fig. 10 is a side view of the ring shaped member shown in Fig. 9, shown partly in section taken on line 10—10 of the latter mentioned figure, Fig. 11 is an elevation view of the exteriorly disposed ring member in the assembly of Fig. 4, showing the position of the four key ways elements for collectively engaging the inner and the intermediary disposed rings, shown in Figs. 7 and 9, to form the complete ring assembly shown in Fig. 4, Fig. 12 is a side view of the ring shaped member of Fig. 11, showing the elements serving for guiding the spacer bars in threaded engagement with the inwardly projecting nut screw elements formed with this ring and with a number of nut screw elements of rings 7 and 9, at the position of the key way elements when in assembled relation to each other, such guiding elements permitting the orientation of the spacer bars in the plane of the assembled ring shaped members, Fig. 13 is a sectional view taken on line 13—13 of Fig. 5, enlarged, Fig. 14 is a fragmentary view, partly in section, viewed at an angle 90° from that of Fig. 13, showing one of the screw threaded portions of one of the spacer bars in engagement with the nut screw elements formed by the projections carried by the inner disposed ring member of the connector, Fig. 15 is an enlarged view of one of the spacer bars used in conjunction with the connector assemblies shown in the tower structure shown in Fig. 1, Fig. 16 is a perspective view of a modified connector device shown with the outer disposed member exploded and in an angular position, for engaging the partial ring assembly formed by the inner and intermediate disposed rings to form a complete connector assembly, Fig. 17 is a developed view of a metal strip used for the construction of the outer disposed ring member, and Fig. 18 is a view of a developed strip of metallic material used for the construction of the inner and intermediate disposed ring members shown in the partial assembly in Fig. 16.

The erection of a toy tower structure as shown in Fig. 1 for example, may conveniently and quickly be effected by the use of any number of connector devices shown at 20, Fig. 1, connecting co-operating spacer bars, as 21, which may be of any desired size and length.

The connector device constructed according to the present invention consists, as best seen in Figs. 4, 5, 6, 13 and 14, of a plurality of ring shaped members 22, 23 and 33. The ring member 22 is formed at its periphery with two pairs of parallelly disposed guiding elements 30—30 and 31—31, disposed substantially at right angles to each other for interfittingly receiving the co-operating ring shaped members 23 and 33.

The ring member 22 is provided with eight pairs of radially and inwardly extending projections 24, each pair forming elements of a nut screw disposed in radial alignment with respective guiding elements 27, formed by the openings shown in Fig. 8, elongated in the plane of this ring member and into which one of the ends, as 25 and 26, of any one of the spacer bars 21, shown in Fig. 15, may be inserted for engaging one of the pairs of projections 24, in the manner of a nut and oriented in the plane of its guiding element for a purpose which will be hereinafter described in detail.

The ring member 22, best seen in Fig. 7, may be constructed of a plastic material having sufficient resiliency so as to permit the screw threaded portions 25 and 26 of spacer bars 21, as the case may be, to flex and thereby tension the projections 24 outwardly upon a simple plunger-like movement of such spacer bars for positioning either one of their screw threaded portions in engagement between any two projections forming a pair, the projections re-engaging the screw threads of the engaged bar under the medium of their own tension, which may then be followed by a small manual turning or angular movement of the spacer bar thus engaged for firmly securing the latter bar to the connector which may consist of a single ring or rings, as the case may be, the number of spacer bars and connector devices, which may be used, being dependent upon the type and size of the structure it desired to erect, while the guiding elements 27, as above mentioned, permit the orientation of the spacer bars mounted thereon relatvie to other connector devices at the other ends of the bars, which may be inclined in the structure being erected.

The co-operating ring member 23, as shown in Fig. 9, is provided with two diametrically opposite key ways 28 and 29, each of a width corresponding to the thickness of ring member 22 for engaging the latter in the position best seen in Fig. 4, that is at right angles thereto.

Ring member 23, in turn, is provided with six pairs of radially and inwardly extending projections, as 32, converging toward each other at their free ends, as shown in Fig. 14, to form, like the projections 24 in ring member 22, elements of nut screws for threadedly engaging the differentially screw threaded ends of spacer bars 21, but in a row at right angles to that of the spacer bars which may have been engaged with the screw elements or projections formed with the ring member 22, the projections 32 of ring member 23 being disposed in radial alignment with the elongated guiding elements 37, formed in the rim portion of this ring, so as to permit the free orientating movement of the engaged spacer bars in that plane and relative to other connector devices included in the erection of the desired structure at the other ends of the bars.

The ring member 23, as shown in Figs. 9 and 10, is provided with two diametrically opposite elongated bar guiding elements, 40 and 41, disposed transversely of the ring for permitting the free orientating movement of the spacer bars fitted therein in the plane of the spacer bars engaging the projections as 24x, 24x1 or 24x2 and 24x3 of ring member 22.

The ring shaped member 33, as shown in Figs. 6, 11 and 12, in turn is provided with four equally and transversely disposed spaced key ways arranged by pairs, 35—35 and 36—36, for engaging the parallel sides 34—34 of ring 23, and two of the parallel sides 30—30 or 31—31 of ring member 22, as the case may be, to form, in co-operation with this ring and ring 23, a complete connector device assembly as shown in Figs. 4, 5 and 6 and in sectional view in Fig. 13.

Ring member 33, Fig. 11, is provided with four pairs of diametrically and inwardly extending projections 43, which, like the projections 24 and 32, formed with the ring members 22 and 23, serve for engaging the screw threaded ends of a number of spacer bars 21, depending upon the type of the structure desired to be erected.

The ring 33, in addition to the four pairs of elongated bar guiding elements 42, which are formed in alignment with their respectively associated pairs of projections 43 and in the plane of this ring, is formed with four transverse and equally spaced guiding elements 44 formed in the wall of the ring radially and contiguous to the key ways 35—35 and 36—36 to serve for guiding a corresponding number of spacer bars 21 in screw threaded engagement with two pairs of oppositely disposed projections 32 of ring 23 and two pairs of the oppositely disposed projections of ring 22, as shown in Figs. 4, 5 and 6.

Similarly, the nut screw elements 24x, 24x1, 24x2 and 24x3, of ring 22, may be engaged by the spacer bars positioned in the co-operating transversely disposed guiding elements 40—41 of ring 23, or engaged by the spacer bars 21 which may be inserted in the guiding elements 44 of ring 33 for collectively securing the spacer bars and the three ring members, thus interfitted in assembled relation to each other when the periphery of the outer disposed rings 33 of the connectors abut against the shoulder portions 25c or 26c of the spacer bar 21.

In the actual erection of a structure of the type shown in Fig. 1, for example, the ring member 23, shown in Fig. 9, is first slipped over any two of the guiding elements 30—30 or 31—31 of ring 22, where the key ways 28—29 of ring 23 position the latter at right angles to that of the plane of ring 22, as indicated by the assembly of ring 22 and 23 in Figs. 4, 5, 6 and 13, that is in position for receiving the ring member 33 by the engagement of its key ways 35—35 and 36—36 with the parallel sides 34—34 of ring 23 and one pair of the guiding elements 30—30, 31—31 of ring member 22, as the case may be, to the position indicated in Figs. 4, 5 and 6, and in the sectional view in Fig. 13, but it is to be noted that the bar guiding elements 44 of ring 33 permit the orientation of the spacer bars 21 in the plane of ring member 23, while the guiding elements 40 and 41, permit the orientation of the spacer bars in the plane of ring member 22, thus as an important novel feature of this invention providing three rows of eight pairs of projections in each plane of the rings 22, 23 and 24, for receiving a number of spacer bars 21 to form, for example, the assembly of the tower top section represented by the bars 21a, 21b, 21c, 21d and 21e, in Fig. 1, in conjunction with the connector devices 20a, 20b, 20c, 20d, 20e and 20f, constructed as above mentioned, the spacer bars 21, bearing identifying marks, not shown, for facilitating any assembly and are dimensioned in such manner that the shorter length of a lower section as 1, for example, correspond to the corner disposed bar 21 of the next higher section and the bar 1x to the corner of the next higher section, and continued in that order of assembly to the highest capacity of the structure desired, the orientation of the bars being for convenience in the assembly of a particular structure whenever two connector devices do not happen to be positioned exactly at the angle defined by the eight engageable positions in each row of the inter-fitted rings.

In the modification of the connector device shown in Fig. 16, the ring shaped member 50 is constructed of a metallic strip 54, shown developed in Fig. 17. This metallic strip is formed with two rows of laterally extending projecting lug members 55 and 56, disposed at equal distance from each other along the length of the strip and the strip bent on line marks, as indicated at 62x, to form a geometrical figure representing an octagonal. The strip 54 is welded in end to end abutting relation as at 57, Fig. 16, and the lug members 55 and 56, formed therewith, are bent in a manner ot project inwardly of the ring with their ends converging toward each other to form nut screw elements serving to engage the screw threaded ends of spacer bars 21, by the medium of their own tension as described in connection with the connector device above described and shown in Fig. 4.

A guiding element is formed in each side of the octagonal ring 50 for receiving a corresponding number of spacer bars 21, as required for the erection of a particular structure, but it is to be noted that the guiding elements 58, 59, 60 and the guiding element 61, which is formed by the cut away portions at the opposite ends of the strip 54, as shown in Fig. 17, co-operate with the lug members, as 63—64, of an intermediary disposed ring member 51y, in the assembly for receiving a corresponding number of spacer bars 21.

The metallic strip shown in Fig. 18 which serves to form the intermediary disposed ring member 51y, is formed with two rows of laterally extending projections arranged by pairs 63—64 and for each pair of these projections there is provided a guiding element 65, having a diameter corresponding to that of the diameter of spacer bars 21 at its screw threaded ends 25 and 26, for receiving and positioning the latter in screw threaded engagement with the pairs of projections 63—64, in a manner which will be hereinafter described in detail.

The metallic strip forming the ring member 51y is bent as indicated by the dotted lines at 66, at an angle to form a geometrical figure representing an octagonal and, as shown in Fig. 16, has its opposite ends welded in abutting relation to each other, as at 67, such welding operation being effected most conveniently following the bending of projections 63—64 inwardly of the ring to form nut screw elements serving, as above mentioned, for threadedly engaging the screw threaded end portions 25 and 26 of spacer bars 21.

A third ring shaped member 52 is constructed of a metallic strip similar to that of ring 51y to which it is welded in assembled relation in the position shown in Fig. 16, that is, where the welded ends of ring member 51y are disposed on the outer side of ring member 52 and the welded ends of ring 52 on the outer and opposite side of ring member 51y so that the projections of each ring serve to form the nut elements at the sides corresponding to the welded ends of these rings, thus providing a continued row of pairs of projections in each plane of the rings 51y and 52, as well as in the plane occupied by ring 50 when the latter is positioned in assembled relation with the rings 51 and 52, as indicated by the projecting lines 68 and 59 where the welded ends 57 of ring 50 occupies, for example, the position indicated by the dotted line 70 on ring 52, Fig. 16.

While the ring shaped members of the connector device, shown in Fig. 4, are described as constructed of plastic material when used for the erection of toys of the example shown in Fig. 1, such ring members may equally well be constructed of castable metallic material for use in the erection of very large structures as scaffoldings, pontoons, bridges, etc.

Similarly, the ring members 50, 51y and 52, Fig. 16, may be constructed of sheet metal of a thickness suitable for the erection of any desired structures, from the toy size to very large structures and to accommodate spacer bars 21 of any size and length.

What I claim is:

1. In a quick erectable structure, a connector device comprising a plurality of angularly interfitted ring shaped members, a plurality of spacer bars having threaded ends and means defining resilient nut-like elements carried by said ring shaped members for engaging the threaded ends of said spacer bars and effecting connection between said spacer bars and said angularly engaged ring shaped members.

2. In a quick erectable structure, a connector device in combination with a plurality of screw threaded bars, said connector device comprising a plurality of ring shaped members having interfitting means for positioning the latter in assembled relation at right angles to each other, each of said rings having a different number of pairs of radially extending projections integrally formed therewith forming nut-like elements disposed in line relative to guiding means formed in each of said rings for receiving said bars in engagement with said projections for connecting said bars to said rings.

3. In a knock down structure, a plurality of screw threaded spacer bars in combination with a connector device, said device comprising a plurality of angularly engaged ring shaped members, each of said members having two parallel rows of inwardly and radially extending yieldable projections arranged in different number of pairs, the projections of one of said rows in each of said ring shaped members converging toward the projections of the other row at their free ends to form nut-like elements in the angular relation of said ring shaped members, radially disposed guiding elements formed in the wall of each of said ring shaped members, one of said guiding elements for each of said pairs of projections for guiding the bars in position for engaging with the projections upon a plunger-like movement of said bars between the pair of said projections.

4. In a quick erectable structure, a connector device in combination with a plurality of screw threaded spacer bars, said device consisting of a number of ring shaped members interfitted in three planes at right angles to each other, said members having different number of nut-like elements disposed in parallel rows in the plane relative to their respective ring, a number of said nut-like elements carried by one of said ring members forming the complement number of said nut-like elements in the rings having the least number of said nut-like elements in the other rows when said ring members are positioned in interfitted relation to each other for engaging the screw threaded ends of an equal number of the bars in the plane of each of said ring members.

5. In a quick erectable structure, the co-operating elements comprising a plurality of screw threaded spacer bars, a connector device for said spacer bars, said connector device comprising a plurality of angularly interfitting ring shaped members, said ring members having similar number of guiding elements for receiving the ends of said bars and having different numbers of radially and inwardly extending projections on each side of each of said guiding elements converging toward each other at their free ends to form rows of equal number of said projections corresponding to said guiding elements for resiliently engaging two diametrically opposite sides of the screw threaded ends of said bars for securing the latter to said ring members in their interfitted relation.

6. A connector device for the assembly of a plurality of spacer bars having screw threaded ends, said device comprising a plurality of ring shaped members, one of said rings having means for interlocking with another of said ring in a plane at right angles thereto, a third ring having means for interlocking with the two first mentioned rings in a plane at right angles thereto and a row of yieldable nut-like elements carried by each of said rings in their interlocked planes for engaging the screw threaded ends of said bars with a springing action for securing said bars in assembled relation to said device.

7. The elements of a quick erectable structure comprising a plurality of screw threaded bars in combination with a connector device, said device comprising a plurality of ring shaped members interfitted in plane at right angles to each other, each of said rings having a plurality of yieldable means arranged by pairs, each pair forming nut-like elements for resiliently engaging the ends of said bars upon a plunger-like movement of the latter in engagement with said means for securing said bars to said device.

8. In a knock down structure a plurality of screw threaded spacer bars, a connector device for said bars, said connector device comprising a plurality of ring shaped members inter-engaged at an angle to each other, each of said ring members having a continuous row of equally spaced pairs of radially extending yieldable projections disposed interiorly thereof and guiding elements formed in the wall of said ring members disposed in radial alignment with each pair of said projections, the projections of each of said pairs normally converging toward each other at their free ends to form nut-like elements for resiliently engaging the screw threaded ends of said bars to form co-operating elements of the structure.

9. In a frame structure, a plurality of screw threaded bars, a connector device for securing said bars in assembled relation, said device comprising a ring shaped member having two pairs of parallelly disposed guiding means at its periphery, each pair disposed at right angles to each other, another ring shaped member having means disposed transversely and interiorly thereof for engaging a pair of said parallelly disposed guiding means of the first mentioned ring shaped member, the last mentioned ring having a pair of parallelly disposed guiding means at its periphery, a third ring shaped member having a plurality of means disposed interiorly and transversely thereof for engaging the second pair of guiding means of the first mentioned ring and the parallelly disposed guiding means of the second mentioned ring collectively, each of said ring shaped members having a plurality of pairs of interiorly extending resilient nut-like elements for engaging the screw threaded portions of said bars with a springing action for effecting screw threaded connections between said bars and said devices to form elements of the structure.

10. A connector device for a quick erectable structure, said device comprising a plurality of ring shaped members, one of said ring members having two pairs of guiding elements, each pair disposed at right angles to each other, a second ring member having diametrically opposite formed key ways transverse thereof for engaging one pair of said guiding elements, said second ring shaped member having guiding elements disposed in parallel relation to each other at its periphery, a third ring member having four key ways for engaging the second pair of guiding elements of the first mentioned ring and the guiding elements of the second mentioned ring in plane at right angles to the first and second mentioned ring members, and co-operating means carried by each of said ring members for threadedly receiving said bars in each of the planes formed by said ring members to form elements of a structure.

References Cited in the file of this patent
UNITED STATES PATENTS

| | | |
|---|---|---|
| 119,323 | Codington | Sept. 26, 1871 |
| 1,446,868 | Baker | Feb. 27, 1923 |
| 1,514,928 | Rabezzana | Nov. 11, 1924 |
| 2,410,874 | Greenberg | Nov. 12, 1946 |
| 2,673,105 | Fitzgerald | Mar. 25, 1954 |